(12) United States Patent
Takayama et al.

(10) Patent No.: US 7,006,413 B2
(45) Date of Patent: Feb. 28, 2006

(54) DISK DRIVING APPARATUS

(75) Inventors: Seiryu Takayama, Kanagawa (JP);
Takao Maruyama, Kanagawa (JP);
Ryo Ando, Tokyo (JP)

(73) Assignee: Sony Corporation, (JP)

( * ) Notice: Subject to any disclaimer, the term of this patent is extended or adjusted under 35 U.S.C. 154(b) by 751 days.

(21) Appl. No.: 10/189,392

(22) Filed: Jul. 8, 2002

(65) Prior Publication Data

US 2003/0007433 A1 Jan. 9, 2003

(30) Foreign Application Priority Data

Jul. 6, 2001 (JP) ............................ P2001-206091

(51) Int. Cl.
*G11B 5/09* (2006.01)

(52) U.S. Cl. ............................ 369/47.36; 369/47.48; 369/124.01

(58) Field of Classification Search ............... 369/47.1, 369/47.28, 47.36, 47.38, 47.48, 53.1, 53.25, 369/53.43, 59.1, 59.19, 59.22, 124.01, 124.14, 369/124.15; 360/73.03, 75
See application file for complete search history.

(56) References Cited

U.S. PATENT DOCUMENTS 5,305,106 A * 4/1994 Fukushima et al. ......... 348/521
6,754,025 B1 * 6/2004 Shepherd et al. ........ 360/73.03

* cited by examiner

*Primary Examiner*—Muhammad Edun
(74) *Attorney, Agent, or Firm*—Rader, Fishman & Grauer PLLC; Ronald P. Kananen

(57) ABSTRACT

The present invention provides a disk driving apparatus which includes an interpolating edge circuit for generating an interpolating signal in accordance with a cycle of an edge detection signal, and a phase switching unit for performing phase switching by both the timing signal and the interpolating signal when a period for which the edge detection signal is normally generated reaches a predetermined value.

5 Claims, 12 Drawing Sheets

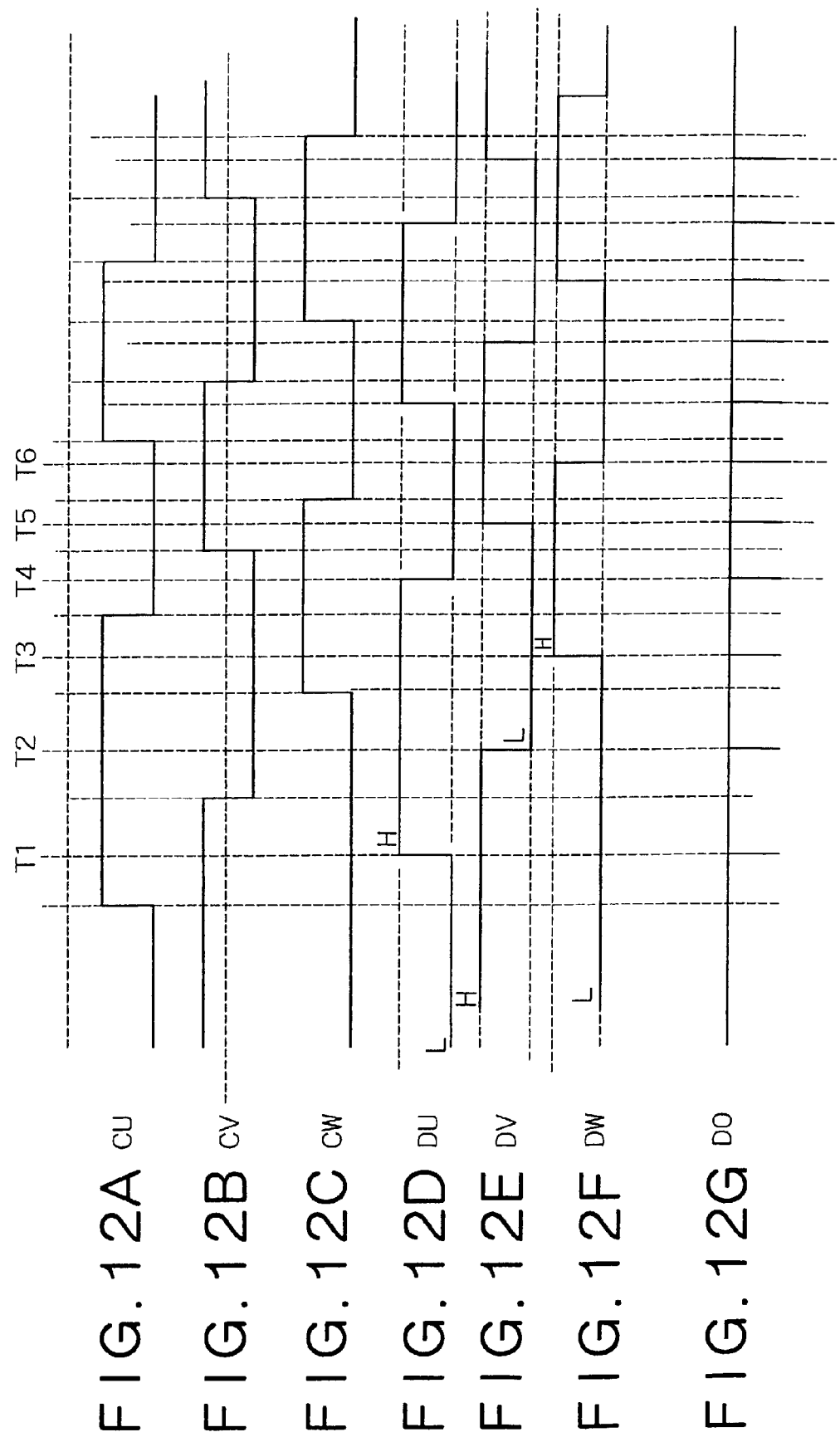

DISK DRIVING APPARATUS

BACKGROUND OF THE INVENTION

The present invention relates to a disk driving apparatus for driving a disk mounted therein.

Conventionally, a disk driving apparatus for driving a disk as a recording medium uses a brushless three-phase motor (hereinafter also referred to simply as a "motor") without a Hall device for detecting a rotational position. A counter-electromotive voltage of each phase obtained by rotation of the motor is compared with a voltage at a central point CP of the motor to generate a signal determining a result of the comparison, and the signal is delayed by a predetermined time, whereby the phase of the motor is switched.

In such a method, when a counter-electromotive edge is not detected due to a disturbance to the rotation of the motor or a sudden change in the rotational speed of the motor, or when a spike noise occurring at the time of phase switching is detected erroneously as a counter-electromotive edge signal, it is not possible to control the motor properly.

In order to solve such a problem, a method has been proposed which interpolates a counter-electromotive edge signal in an analog manner by a PLL circuit using a voltage-controlled oscillator.

However, the method of controlling a counter-electromotive edge signal by the analog PLL circuit requires a voltage-controlled oscillator, as mentioned above. Therefore, the number of external components, the number of pins required of an LSI and the like are increased, which results in an increase in the cost of manufacturing.

In addition, such a control method requires a low-pass filter included in the analog PLL circuit to be adjusted by hardware means. It is therefore difficult to optimize control of the motor.

Furthermore, the characteristics of the above-mentioned voltage-controlled oscillator may vary greatly when the voltage-controlled oscillator is mass-produced. Therefore, when the voltage-controlled oscillator is included in a motor driver IC, the voltage-controlled oscillator can be a factor in an decrease in the yield of the motor driver IC.

SUMMARY OF THE INVENTION

The present invention has been made to solve the above problems, and it is accordingly an object of the present invention to realize highly reliable motor control and provide a disk driving apparatus at reduced cost.

The object of the present invention is achieved by providing a disk driving apparatus which includes interpolating signal generating means for generating an interpolating signal in accordance with a cycle of a timing signal, period measuring means for measuring a period for which the timing signal is generated normally, and motor control means for controlling a motor by both the timing signal and the interpolating signal when the period measured by the period measuring means reaches a predetermined value and more.

With such means, when the timing signal has been generated normally for the predetermined period, it is possible to readily maintain a state of the motor being driven for rotation while using the interpolating signal.

The disk driving apparatus further includes operation switching means for switching an operation by selectively supplying the motor control means with one of the timing signal and the interpolating signal according to a switching signal supplied thereto. It is thereby possible to readily switch on and off the interpolating operation.

The object of the present invention is achieved by providing a disk driving apparatus which includes interpolating signal generating means for generating an interpolating signal in accordance with a cycle of a timing signal, signal level determining means for determining in predetermined timing whether a logical level of the timing signal is an expected logical level, and motor control means for controlling a motor according to the timing signal and controlling the motor according to the interpolating signal when the signal level determining means determines that the logical level of the timing signal is not the expected logical level.

With such means, the signal level determining means can monitor the timing signal to readily determine whether the timing signal is generated normally. Thus, it is possible to readily realize control of the motor by the interpolating signal as required.

The disk driving apparatus further includes window signal generating means for generating a window signal that is periodically activated for a predetermined period in accordance with the cycle of the timing signal and interpolating signal masking means for supplying the motor control means with only an interpolating signal generated within the period for which the window signal is activated. It is thereby possible to surely remove noise of the interpolating signal.

BRIEF DESCRIPTION OF THE DRAWINGS

FIGS. 12A, 12B, 12C, 12D, 12E, 12F, and 12G are a timing chart of assistance in explaining the phase switching operation of the disk driving apparatus shown in FIG. 1.

DETAILED DESCRIPTION OF THE PREFERRED EMBODIMENTS

Figure 1:
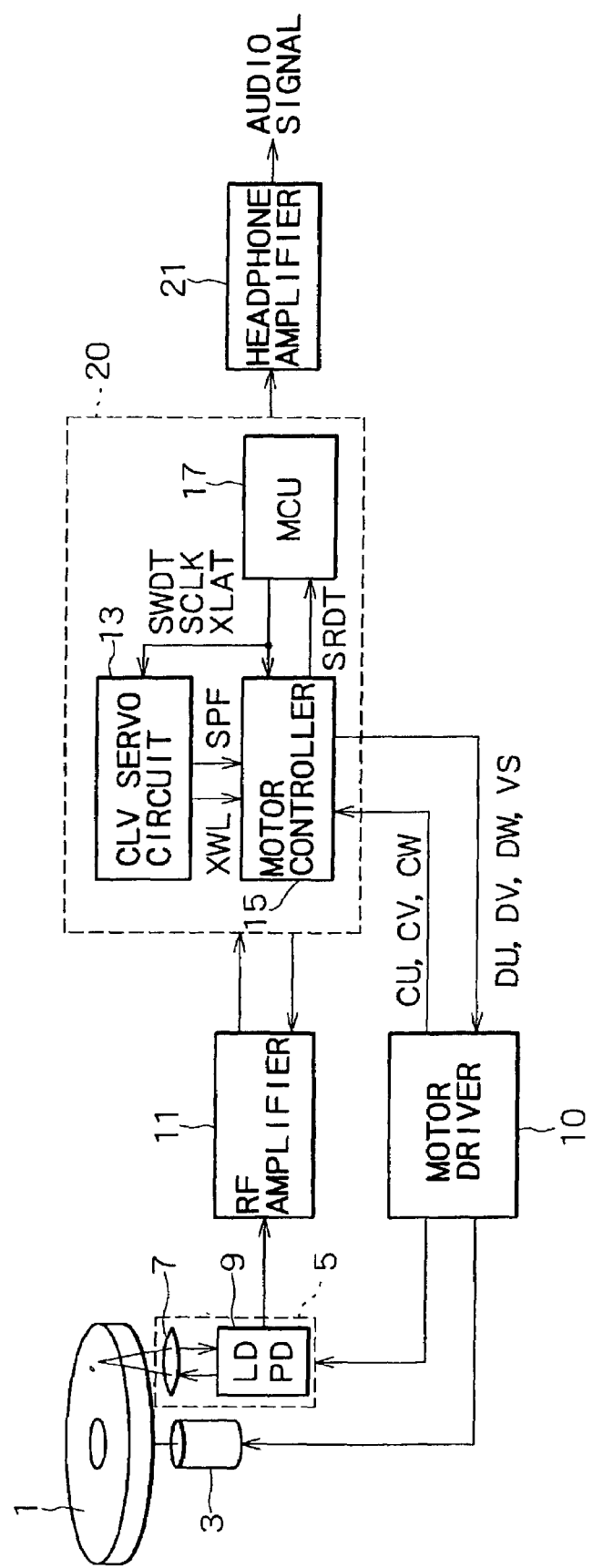
FIG. 1 is a block diagram showing a configuration of a disk driving apparatus according to an embodiment of the present invention.

A preferred embodiment of the present invention will hereinafter be described in detail with reference to the drawings. The same reference numerals in the figures denote the same or corresponding parts.

FIG. 1 is a block diagram showing a general configuration of a disk driving apparatus according to an embodiment of the present invention. As shown in FIG. 1, the disk driving apparatus according to the embodiment of the present invention includes: a spindle motor 3 for rotating a disk 1; a reading unit 5 for reading a signal recorded on the disk 1; a motor driver 10; an RF amplifier 11; a system LSI 20; and a headphone amplifier 21. The reading unit 5 includes a pickup 7 and a device unit 9 formed by a laser diode (LD) and a photodetector IC (PD). The system LSI 20 includes a CLV servo circuit 13, a motor controller 15, and an MCU 17. The spindle motor 3, which will be described later in detail, is formed by a three-phase motor, as mentioned above.

The spindle motor 3 and the reading unit 5 are connected to the motor driver 10. The RF amplifier 11 is connected to the device unit 9. The system LSI 20 is connected to the motor driver 10 and the RF amplifier 11. The headphone amplifier 21 is connected to the system LSI 20.

The motor controller 15 is connected to the motor driver 10. The CLV servo circuit 13 is connected to the motor controller 15 and the MCU 17. The MCU 17 is connected to the motor controller 15.

In the thus formed disk driving apparatus according to the present embodiment, a signal detected by the photodetector IC included in the device unit 9 is amplified by the RF amplifier 11 and then subjected to predetermined processing by the system LSI 20. The signal is amplified by the headphone amplifier 21 and then outputted as an audio signal.

The CLV servo circuit 13 generates a signal SPF by performing pulse width modulation in response to signals SWDT, SCLK, and XLAT supplied from the MCU 17 and then supplies the signal SPF to the motor controller 15. Also, the CLV servo circuit 13 generates a signal XWL and then supplies the signal XWL to the motor controller 15.

The motor controller 15 is controlled by the signals SWDT, SCLK, and XLAT supplied from the MCU 17. The motor controller 15 generates a drive voltage VS for driving the spindle motor 3 on the basis of the signal SPF supplied from the CLV servo circuit 13 and then supplies the drive voltage VS to the motor driver 10. Also, the motor controller 15 generates logical drive signals DU, DV, and DW for controlling the spindle motor 3 and then supplies the logical drive signals DU, DV, and DW to the motor driver 10.

The motor driver 10 generates signals CU, CV, and CW determining a rotational position of the motor in response to the logical drive signals DU, DV, and DW and the drive voltage VS supplied thereto and then supplies the signals CU, CV, and CW to the motor controller 15.

Figure 2:
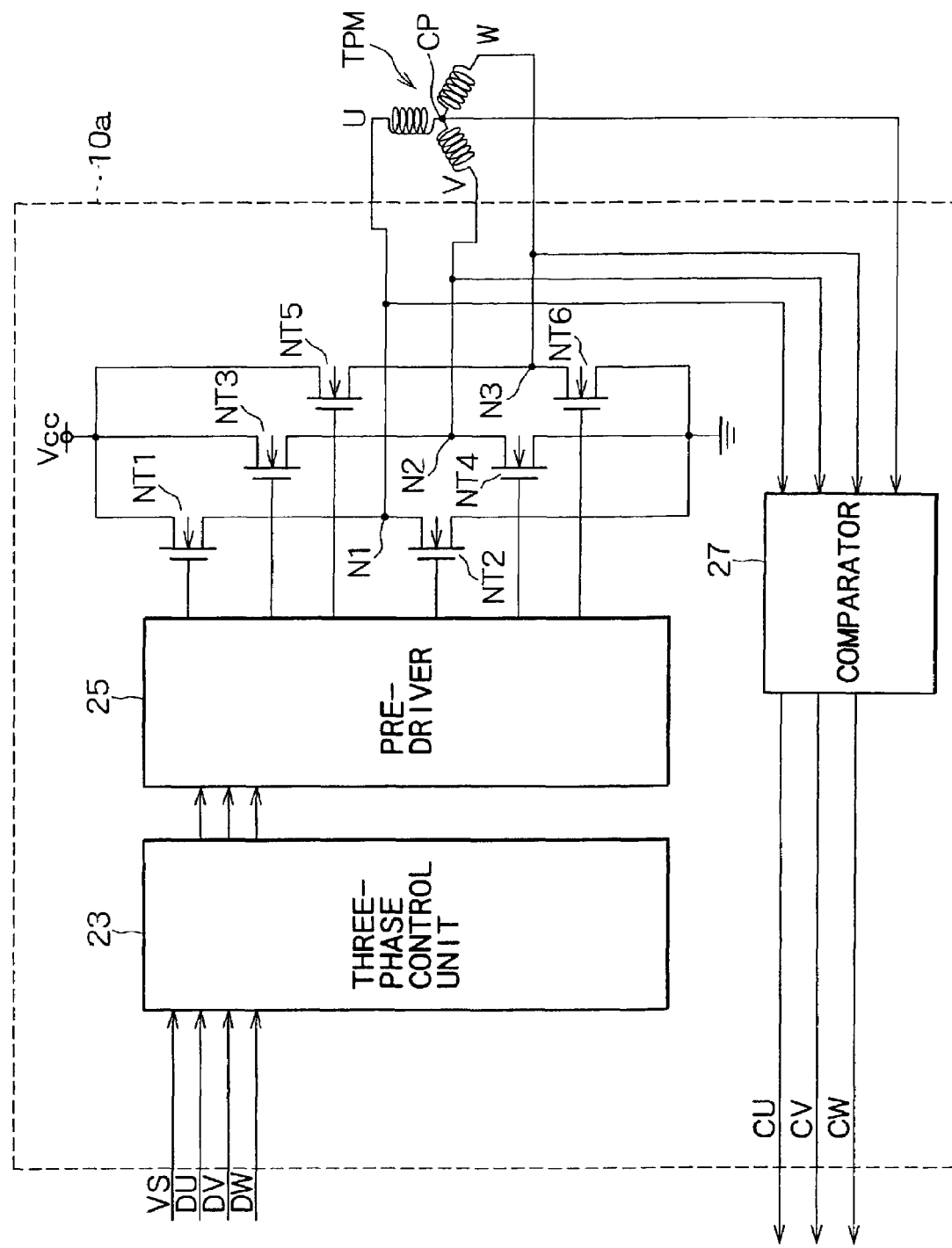
FIG. 2 is a diagram showing a configuration of a driver unit included in a motor driver shown in FIG. 1.

FIG. 2 is a diagram showing a configuration of a drive unit 10a included in the motor driver 10 shown in FIG. 1. As shown in FIG. 2, the drive unit 10a includes a three-phase control unit 23, a pre-driver 25, a comparator 27, N-channel MOS transistors NT1 to NT6, and intermediate nodes N1 to N3. The three-phase control unit 23 is connected to the motor controller 15. The pre-driver 25 is connected to the three-phase control unit 23.

The N-channel MOS transistors NT1 and NT2, the N-channel MOS transistors NT3 and NT4, and the N-channel MOS transistors NT5 and NT6 are each connected in series with each other between a power supply voltage node Vcc and a ground node. Gates of the N-channel MOS transistors NT1 to NT6 are connected to the pre-driver 25.

The intermediate node N1 situated between the N-channel MOS transistors NT1 and NT2, the intermediate node N2 situated between the N-channel MOS transistors NT3 and NT4, and the intermediate node N3 situated between the N-channel MOS transistors NT5 and NT6 are connected to a motor TPM and the comparator 27. A central point CP of the motor TPM is connected to the comparator 27. The motor TPM is included in the spindle motor 3 shown in FIG. 1.

In the thus formed drive unit 10a, the three-phase control unit 23 determines a direction of a current for driving the motor TPM on the basis of the logical drive signals DU, DV, and DW and the drive voltage VS supplied from the motor controller 15 and then supplies a signal specifying the direction of the current to the pre-driver 25. Then, the pre-driver 25 decodes the signal supplied thereto and selectively supplies the gates of the N-channel MOS transistors NT1 to NT6 with a voltage equal to or higher than a threshold voltage. Thus, the N-channel MOS transistors NT1 to NT6 are selectively turned on to adjust the potentials of the intermediate nodes N1 to N3, whereby the motor TPM is supplied with the current in the specified direction.

The comparator 27 generates the signals CU, CV, and CW determining a rotational position of the motor by comparing a voltage of each phase (potentials of the intermediate nodes N1 to N3) with a potential of the central point CP and then supplies the signals CU, CV, and CW to the motor controller 15.

Figure 3:
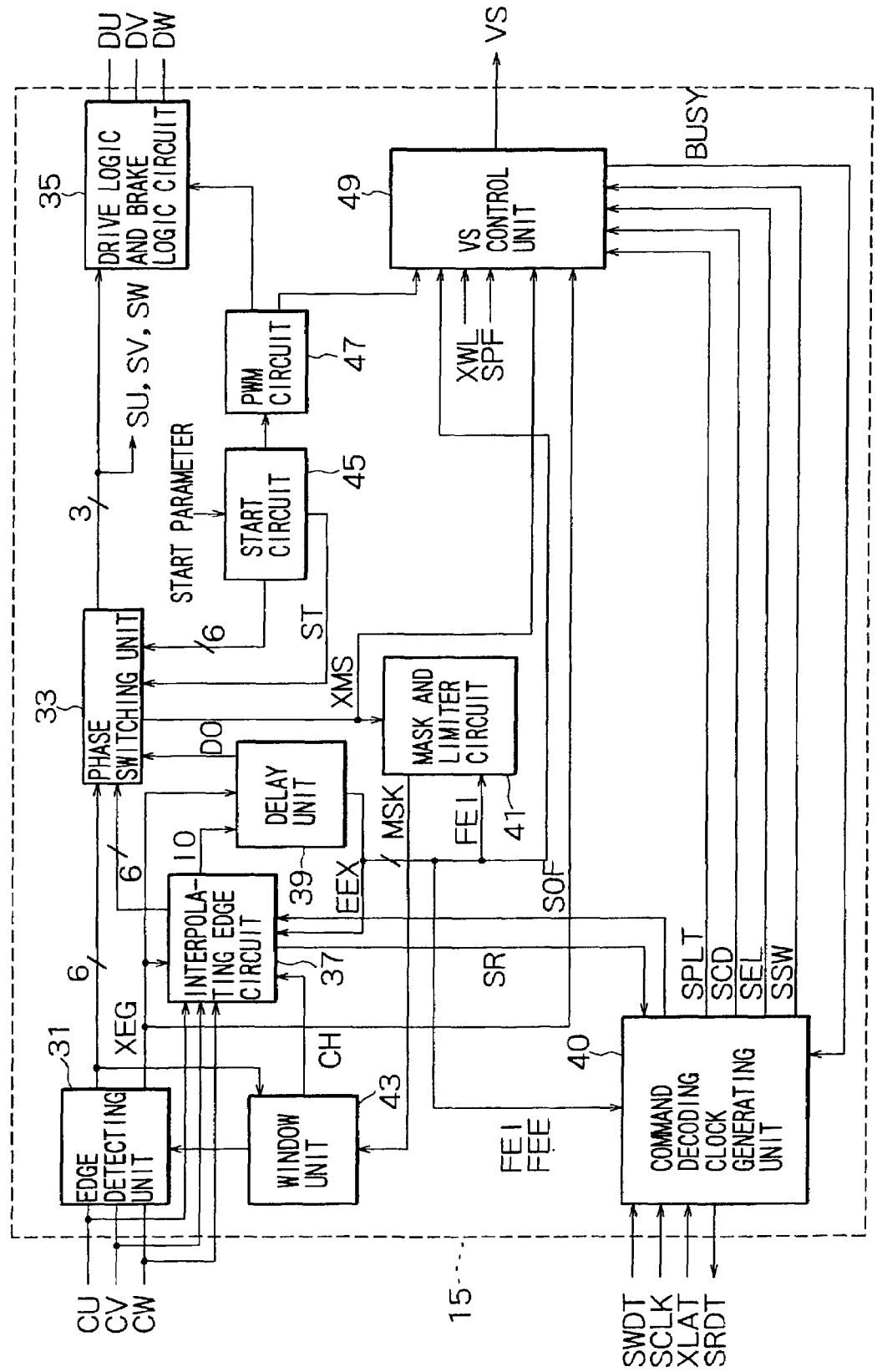
FIG. 3 is a block diagram showing a configuration of a motor controller shown in FIG. 1.

FIG. 3 is a diagram showing a configuration of the motor controller 15 shown in FIG. 1. As shown in FIG. 3, the motor controller 15 includes an edge detecting unit 31, a phase switching unit 33, a drive logic and brake logic circuit 35, an interpolating edge circuit 37, a delay unit 39, a command decoding clock generating unit 40, a mask and limiter circuit 41, a window unit 43, a start circuit 45, a PWM circuit 47, and a VS control unit 49.

In this case, the edge detecting unit 31 is connected to the motor driver 10. The phase switching unit 33 is connected to the edge detecting unit 31, the interpolating edge circuit 37, the delay unit 39, and the start circuit 45. The drive logic and brake logic circuit 35 is connected to the phase switching unit 33 and the PWM circuit 47.

The interpolating edge circuit 37 is supplied with the signals CU, CV, and CW, and is connected to the edge detecting unit 31 the delay unit 39, the command decoding clock generating unit 40, and the window unit 43. The delay unit 39 is connected to the edge detecting unit 31 and the interpolating edge circuit 37.

The command decoding clock generating unit 40 is connected to the MCU 17, the CLV servo circuit 13, the delay unit 39, and the VS control unit 49. The mask and limiter circuit 41 is connected to the phase switching unit 33 and the delay unit 39. The window unit 43 is connected to the edge detecting unit 31 and the mask and limiter circuit 41.

The start circuit 45 is supplied with a start parameter required in starting the spindle motor 3. The PWM circuit 47 is connected to the start circuit 45. The VS control unit 49 is connected to the edge detecting unit 31, the phase switching unit 33, the delay unit 39, the PWM circuit 47, and the command decoding clock generating unit 40.

Operation of the thus formed motor controller 15 will be described in the following. The edge detecting unit 31 detects a transition (edge) of the signals CU, CV, and CW shown in FIGS. 9A to 9C and FIGS. 12A to 12C, to be described later, subjects an edge detection signal obtained by detecting an edge of each of the phases to NOR operation, and thereby generates and outputs an edge detection signal XEG.

The delay unit 39 calculates an amount of delay required in calculating phase switching timing, according to the edge detection signal XEG generated by the edge detecting unit 31, and generates an edge interval signal FEI determining a rotational speed of the spindle motor 3, which will be described later in detail.

When the edge is not detected correctly by the edge detecting unit 31, the motor goes out of step. Therefore, in order to rotate the spindle motor 3 properly even when the edge to be detected is absent, the interpolating edge circuit 37 interpolates an edge according to the signals CU, CV, and CW, the edge detection signal XEG supplied from the edge detecting unit 31, an edge interval signal EEX supplied from the delay unit 39, a check signal CH supplied from the window unit 43 and the like, and then the interpolating edge circuit 37 supplies a phase switching signal to the phase switching unit 33 and the delay unit 39. The interpolating edge circuit 37 will be described later in detail.

The phase switching unit 33 generates a mask set signal XMS determining the phase switching timing of the motor TPM according to signals supplied from the edge detecting unit 31, the interpolating edge circuit 37, and the command decoding clock generating unit 40 and the amount of delay determined by the delay unit 39 and then supplies the mask set signal XMS to the mask and limiter circuit 41 and the VS control unit 49. The phase switching unit 33 also supplies signals su, sv, and sw for controlling the rotation of the spindle motor 3 to the drive logic and brake logic circuit 35.

The start circuit 45 generates a start signal ST and a phase switching signal according to the start parameter supplied thereto, as described above. The start circuit 45 supplies the start signal ST to the phase switching unit 33 and supplies the phase switching signal to the phase switching unit 33 and the PWM circuit 47. In this case, the PWM circuit 47 subjects the signal supplied from the start circuit 45 to pulse width modulation to thereby generate a pulse width modulated (PWM) signal. The drive logic and brake logic circuit 35 accelerates or decelerates the rotation of the spindle motor 3 and generates logical drive signals DU, DV, and DW according to the signals supplied from the phase switching unit 33.

The mask and limiter circuit 41 determines a mask time according to the edge interval signal FEI supplied from the delay unit 39 and the mask set signal XMS supplied from the phase switching unit 33, and it also limits the rotational speed of the spindle motor 3 to within a predetermined range. Also, the mask and limiter circuit 41 generates a mask signal MSK and then supplies the mask signal MSK to the window unit 43.

The window unit 43 generates a window signal according to the edge detection signal and the mask signal MSK supplied thereto and then supplies the window signal to the edge detecting unit 31. The window unit 43 also supplies a check signal CH to the interpolating edge circuit 37. The window signal is a pulse signal determining a state of allowing or not allowing edge detection. Only while the window signal is at a high level, for example, the edge detection signal is outputted from the edge detecting unit 31.

The command decoding clock generating unit 40 generates a serial signal SRDT according to a signal SR supplied from the interpolating edge circuit 37, the edge interval signal FEI supplied from the delay unit 39, and a signal BUSY supplied from the VS control unit 49 and then supplies the serial signal SRDT to the MCU 17. Then, the MCU 17 supplies commands SWDT, SCLK, and XLAT to the command decoding clock generating unit 40 while monitoring the serial signal SRDT by execution of software.

The command decoding clock generating unit 40 decodes the commands SWDT, SCLK, and XLAT supplied from the MCU 17 to thereby generate a maximum control signal SPLT, a selection signal SEL, a command signal SCD, and a control switching signal SSW.

The VS control unit 49 generates a drive voltage VS according to the pulse width modulated signal supplied from the PWM circuit 47, the edge interval signal FEI supplied from the delay unit 39, the signals SPF and XWL supplied from the CLV servo circuit 13, the mask set signal XMS supplied from the phase switching unit 33, the edge detection signal XEG supplied from the edge detecting unit 31, and the maximum control signal SPLT, the selection signal SEL, and the command signal SCD supplied from the command decoding clock generating unit 40. The VS control unit 49 supplies the drive voltage VS to the motor driver 10.

Also, the VS control unit 49 turns on or off so-called soft switching control that decreases a maximum value of the drive voltage VS at the time of phase switching according to the control switching signal SSW supplied from the command decoding clock generating unit 40.

Figure 4:
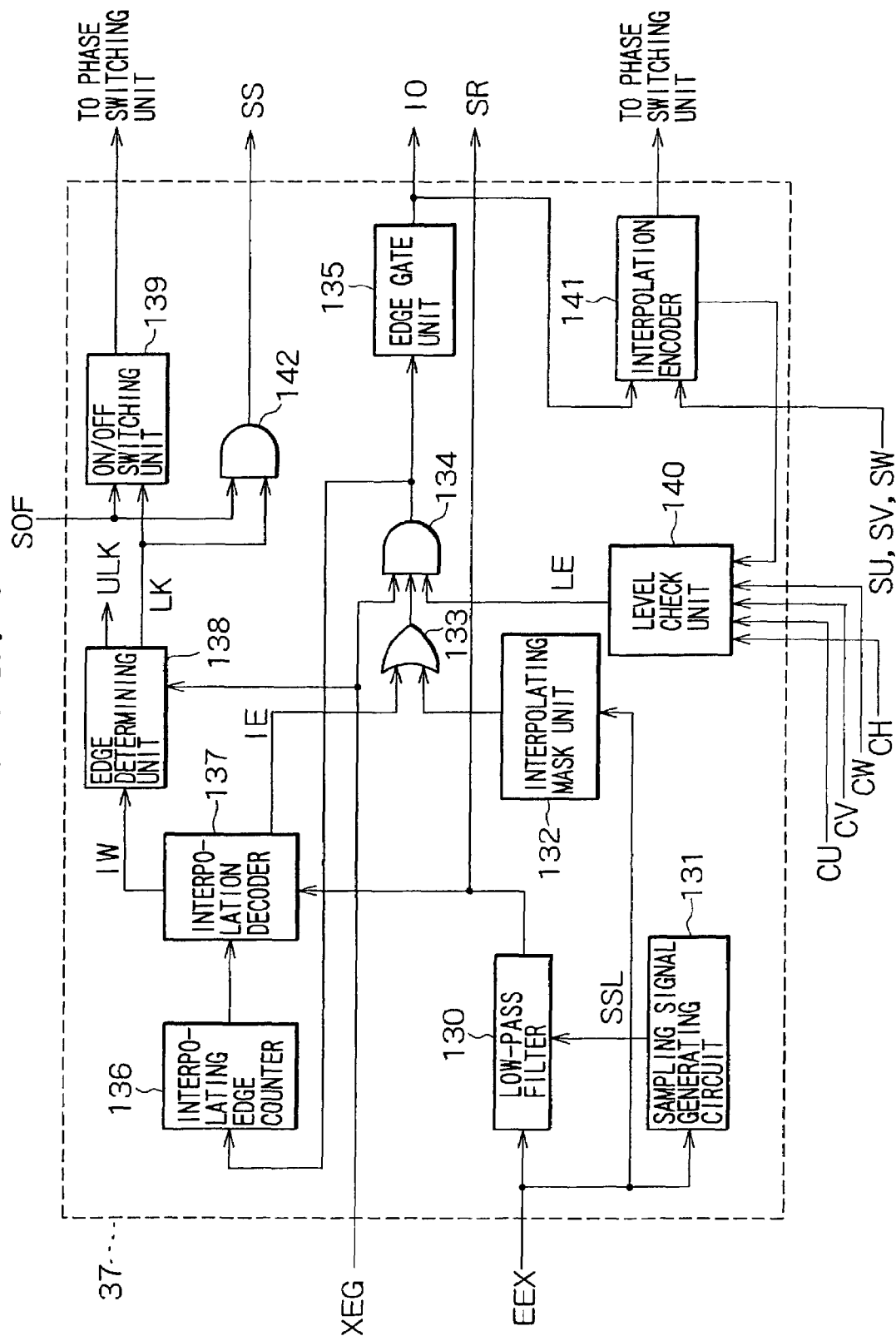
FIG. 4 is a block diagram showing a configuration of an interpolating edge circuit shown in FIG. 3.

FIG. 4 is a block diagram showing a configuration of the interpolating edge circuit 37 shown in FIG. 3. As shown in FIG. 4, the interpolating edge circuit 37 includes a low-pass filter 130, a sampling signal generating circuit 131, an interpolation mask unit 132, an OR circuit 133, AND circuits 134 and 142, an edge gate unit 135, an interpolating edge counter 136, an interpolation decoder 137, an edge determining unit 138, an ON/OFF switching unit 139, a level check unit 140, and an interpolation encoder 141.

In this case, the low-pass filter 130, the sampling signal generating circuit 131, and the interpolation mask unit 132 are connected to the delay unit 39. The OR circuit 133 is connected to the interpolation mask unit 132 and the interpolation decoder 137 to be described later. The AND circuit 134 is supplied with the edge detection signal XEG and is connected to the OR circuit 133 and the level check unit 140 to be described later.

The edge gate unit 135 and the interpolating edge counter 136 are connected to the AND circuit 134. The interpolation decoder 137 is connected to the low-pass filter 130 and the interpolating edge counter 136. The edge determining unit 138 is connected to the edge detecting unit 31 and the interpolation decoder 137. The ON/OFF switching unit 139 and the AND circuit 142 are connected to the command decoding clock generating unit 40 and the edge determining unit 138.

The level check unit 140 is supplied with the signals CU, CV, and CW and is connected to the window unit 43 and the interpolation encoder 141. The interpolation encoder 141 is connected to the phase switching unit 33.

The thus formed interpolating edge circuit 37 generates a phase switching signal IO by interpolating an edge signal by the following two methods. A first method generates the phase switching signal IO on the basis of the edge detection signal XEG generated by the edge detecting unit 31 and the counter-electromotive edge signal EEX generated by the delay unit 39. A second method generates the phase switching signal IO according to level of the signals su, sv, and sw supplied from the phase switching unit 33.

The first method will be described in the following with reference to FIGS. 5A to 5E to FIGS. 9A to 9F. First, the sampling signal generating circuit 131 generates a sampling signal SSL for determining a frequency characteristic of the low-pass filter 130 on the basis of the signal EEX determining the time intervals of counter-electromotive edges, which signal EEX is supplied from the delay unit 39.

To generate an interpolating edge signal IE requires predicting, after detecting a counter-electromotive edge, the timing of appearance of a next counter-electromotive edge signal. The low-pass filter 130 enables the prediction by reducing the frequency of the signal EEX to a level that makes it possible to follow the number of rotations of the motor.

Figure 5:
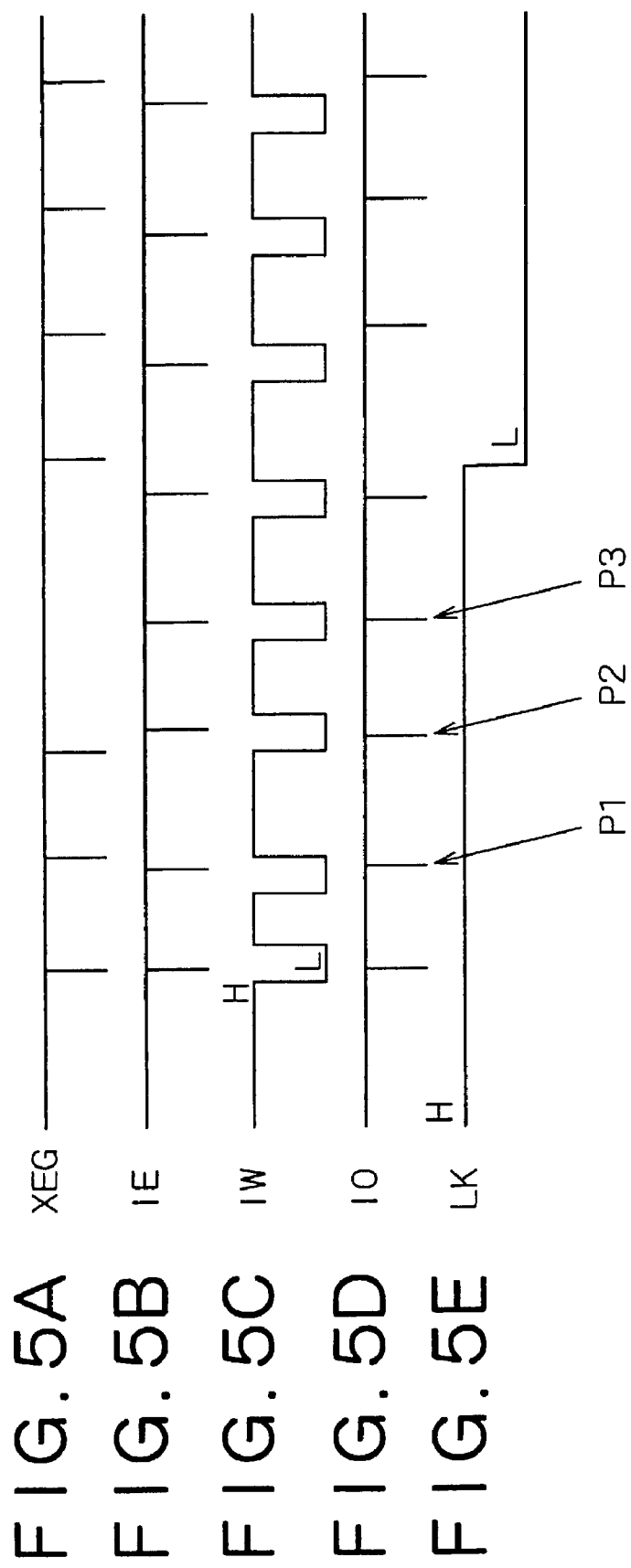
FIGS. 5A, 5B, 5C, 5D, and 5E are a first timing chart illustrating the operation of the interpolating edge circuit shown in FIG. 4.

The interpolation decoder 137 compares a signal supplied from the low-pass filter 130 with a signal supplied from the free-running interpolating edge counter 136 and thereby generates an interpolating edge signal IE shown in FIG. 5B and a capture window signal IW shown in FIG. 5C.

Figure 6:
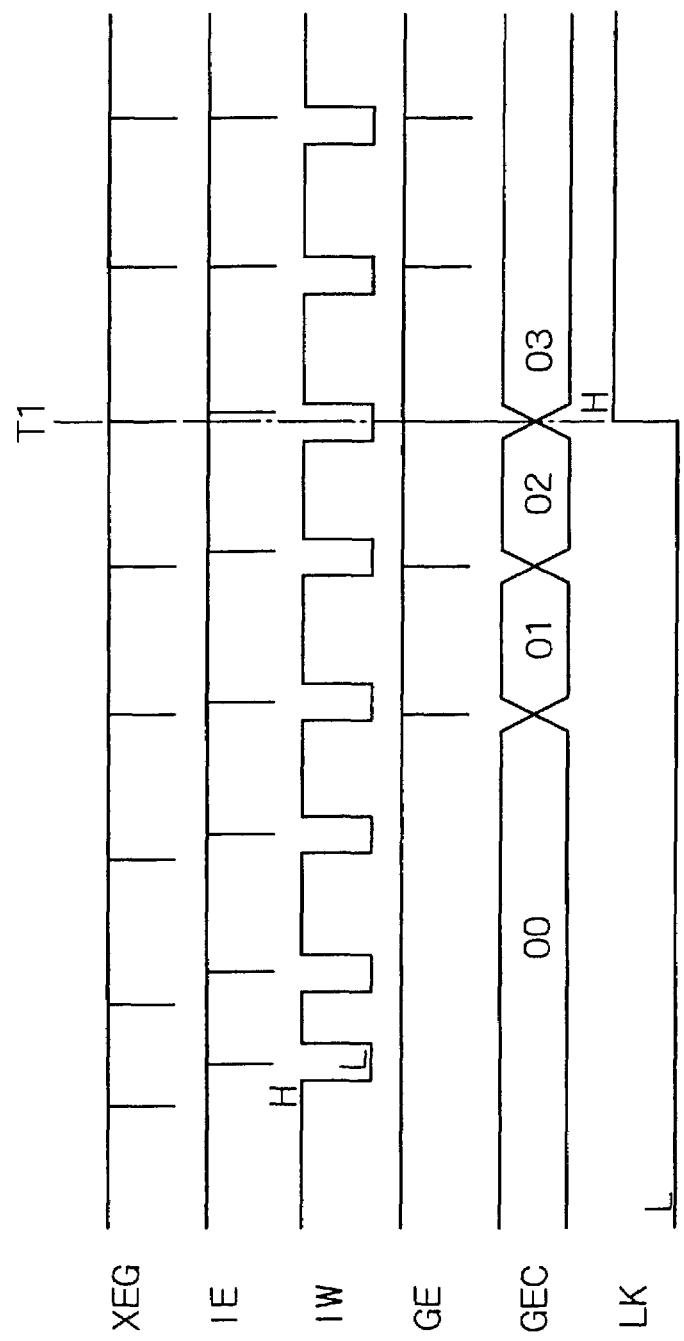
FIGS. 6A, 6B, 6C, 6D, 6E, and 6F are a second timing chart illustrating the operation of the interpolating edge circuit shown in FIG. 4.
Figure 7:
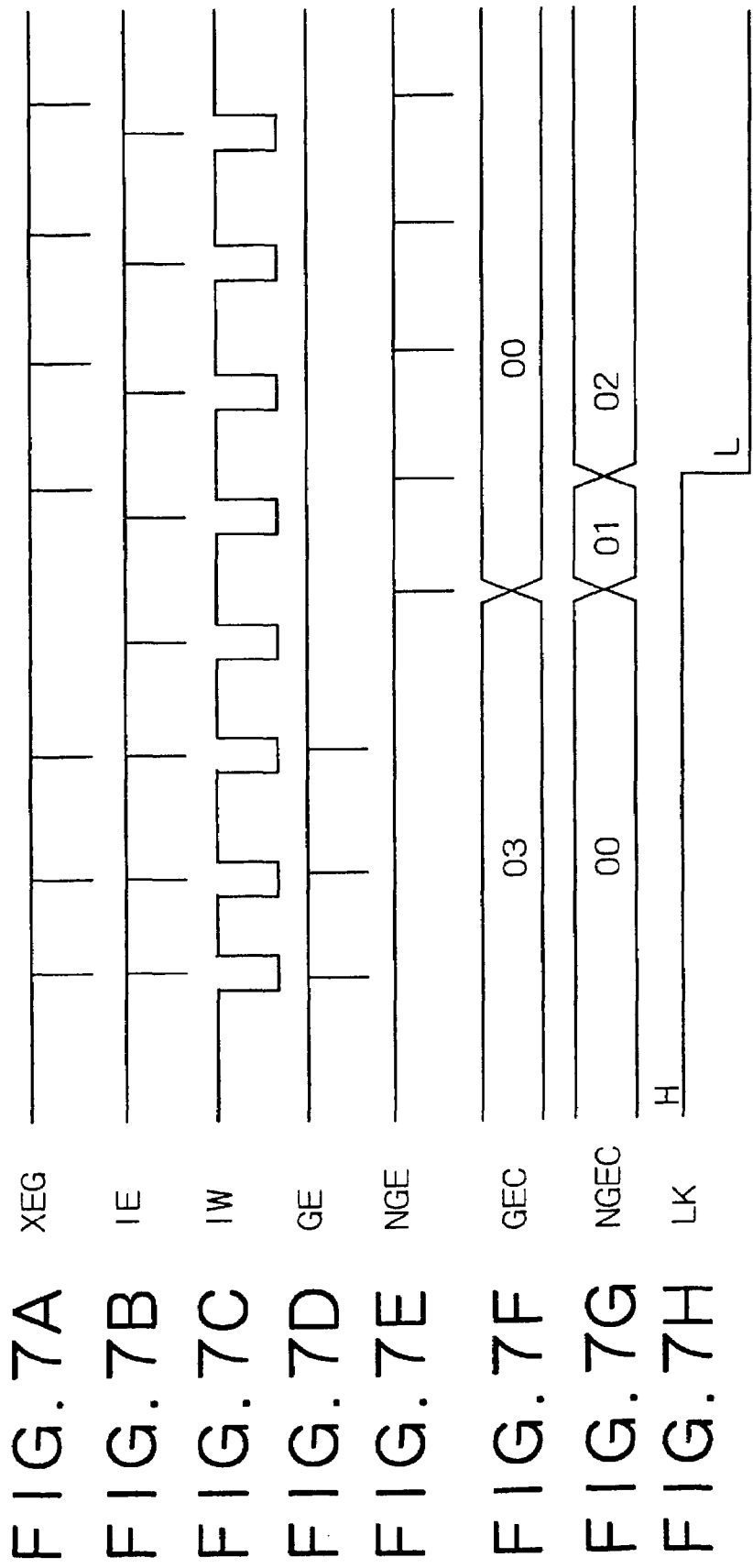
FIGS. 7A, 7B, 7C, 7D, 7E, 7F, 7G, and 7H are a third timing chart illustrating the operation of the interpolating edge circuit shown in FIG. 4.
Figure 8:
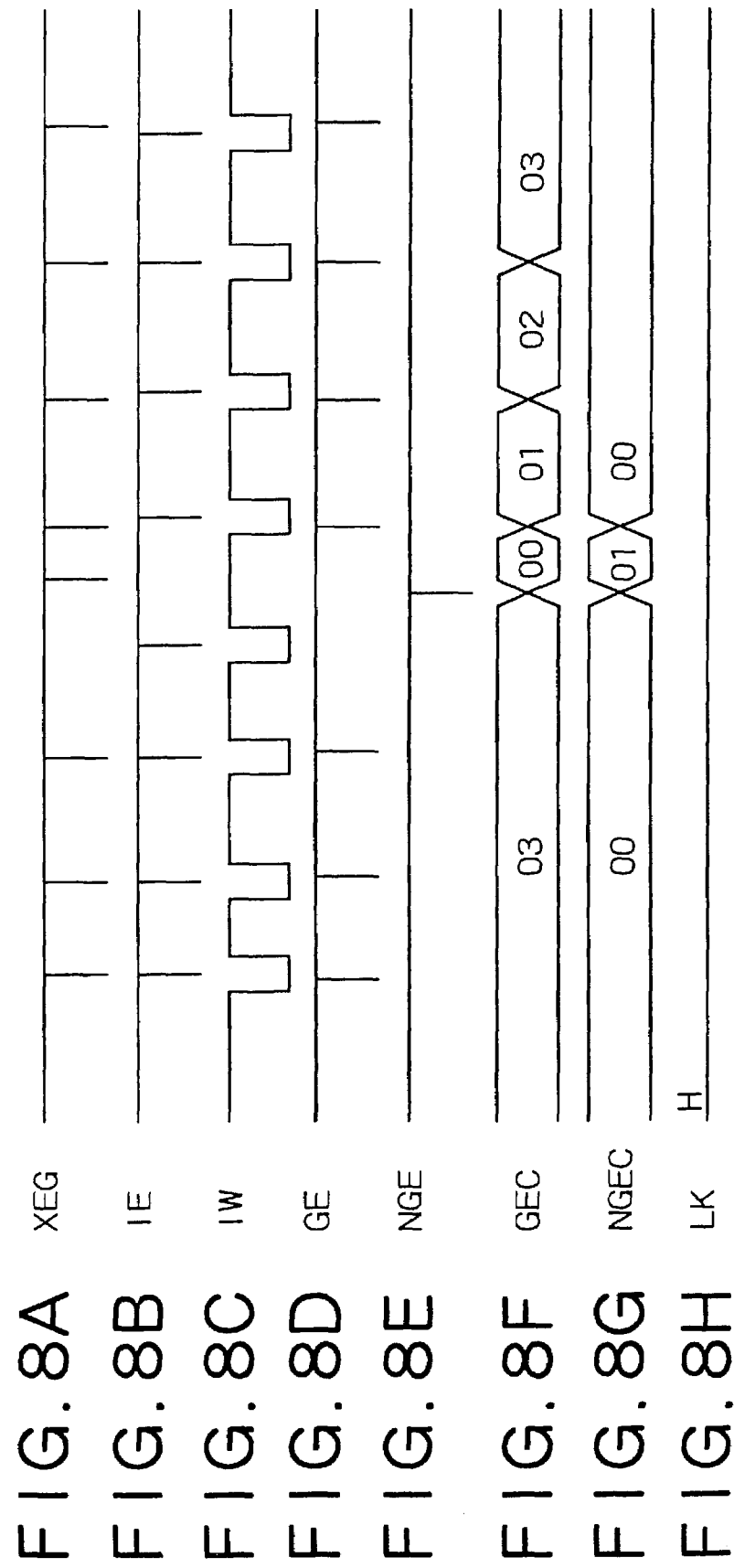
FIGS. 8A, 8B, 8C, 8D, 8E, 8F, 8G, and 8H are a fourth timing chart illustrating the operation of the interpolating edge circuit shown in FIG. 4.

The edge determining unit 138 determines whether control of the rotation of the motor is in a locked state according to the edge detection signal XEG supplied from the edge detecting unit 31 and the capture window signal IW supplied from the interpolation decoder 137. Specifically, when activation timing of the edge detection signal XEG shown in FIG. 5A falls within a low level (L) period (window) of the capture window signal IW shown in FIG. 5C, an edge signal GE is activated to a low level, as shown in FIG. 6D. When the activation timing does not fall within the window, a NG edge signal NGE is activated to a low level as shown in FIG. 8E.

The edge determining unit 138 counts the number of activations of the edge signal GE (hereinafter also referred to as a "good count") and the number of activations of the NG edge signal NGE (hereinafter also referred to as an "NG count"), and thereby determines whether the control of the rotation of the motor is in a locked state or in an unlocked state. As shown in FIG. 5E, when the edge determining unit 138 determines that the control of the rotation of the motor is in a locked state, the edge determining unit 138 outputs a lock signal LK at a high level (H) to interpolate the interpolating edge signal IE, as described later. When the edge determining unit 138 determines that the control of the rotation of the motor is in an unlocked state, the edge determining unit 138 outputs a lock signal LK at a low level (L). An unlock signal ULK outputted from the edge determining unit 138 is an inverted signal of the lock signal LK.

The timing chart of FIGS. 5A, 5B, 5C, 5D, and 5E shows an example of the operation of the edge determining unit 138 in a case where the edge determining unit 138 is set to determine that the control of the rotation of the motor is in a locked state when the good count is increased three consecutive times or more and is set to determine that the control of the rotation of the motor is in an unlocked state when the NG count is increased two consecutive times or more. Incidentally, a threshold value of such counts can be set by the MCU 17, for example.

As shown in FIG. 5D, during a period when the lock signal LK is at a high level, one of the edge detection signal XEG and the interpolating edge signal IE that is first detected within a window is outputted as a phase switching signal 10 from the interpolating edge circuit 37. Specifically, pulses P1 and P3 shown in FIG. 5D are interpolated in correspondence with the interpolating edge signal IE shown in FIG. 5B, while a pulse P2 is generated in correspondence with the edge detection signal XEG shown in FIG. 5A. Such an interpolating method is realized by forming the edge gate unit 135 shown in FIG. 4 by a set-reset flip-flop or the like.

FIGS. 6A, 6B, 6C, 6D, 6E, and 6F are a timing chart of an example of the operation of the edge determining unit 138 when the good count is increased three consecutive times or more and thereby the edge determining unit 138 determines that the control of the rotation of the motor is in a locked state. In a case where the threshold value of the good count is preset to three as described above, the lock signal LK is switched from a low level (L) to a high level (H) at a time T1 when the count value GEC of the good count increased in correspondence with the edge signal GE reaches three, as shown in FIGS. 6D to 6F. Thus, during a period before the time T1 during which period the lock signal LK is at a low level, the edge detection signal XEG is used as it is as a phase switching signal. During a period after the time T1 during which period the lock signal LK is at a high level, the edge detection signal XEG and the interpolating edge signal IE are used as a phase switching signal.

Similarly, FIGS. 7A, 7B, 7C, 7D, 7E, 7F, 7G, and 7H show an operation of the edge determining unit 138 for releasing a locked state by switching the lock signal LK from a high level to a low level as a result of the NG count being increased two consecutive times and thereby a NG count value NGEC reaching two after the count value GEC of the good count reached three.

In addition, FIGS. 8A, 8B, 8C, 8D, 8E, 8F, 8G, and 8H show an operation of the edge determining unit 138 when the NG count is increased only once after the count value GEC of the good count reached three. In this case, although the NG count value NGEC is set to one, the NG counts value NGEC is smaller than the preset threshold value. Therefore, as shown in FIG. 8H, the level of the lock signal LK is maintained at a high level (H).

Even the interpolating edge signal IE mentioned above may be generated in obviously inappropriate timing. Accordingly, as shown in FIG. 4, the interpolation mask unit 132 is arranged in the interpolating edge circuit 37 to provide a mask following the number of rotations of the motor for the interpolating edge signal IE, as in the case of a mask for preventing erroneous detection of a counter-electromotive edge at the time of phase switching.

The first method has been described above. With the above method, the ease of transition to a locked state or an unlocked state can be controlled by changing the window width of the capture window signal IW as well as the above-mentioned threshold value.

The second method of generating a phase switching signal IO will be described next. The level check unit 140 shown in FIG. 4 monitors the signals CU, CV, and CW shown in FIGS. 9A to 9C. In timing in which a check signal CH shown in FIG. 9E supplied from the window unit 43 is raised to a high level (H), the level check unit 140 checks the level of the signals CU, CV, and CW to determine whether the level is an expected level.

Figure 9:
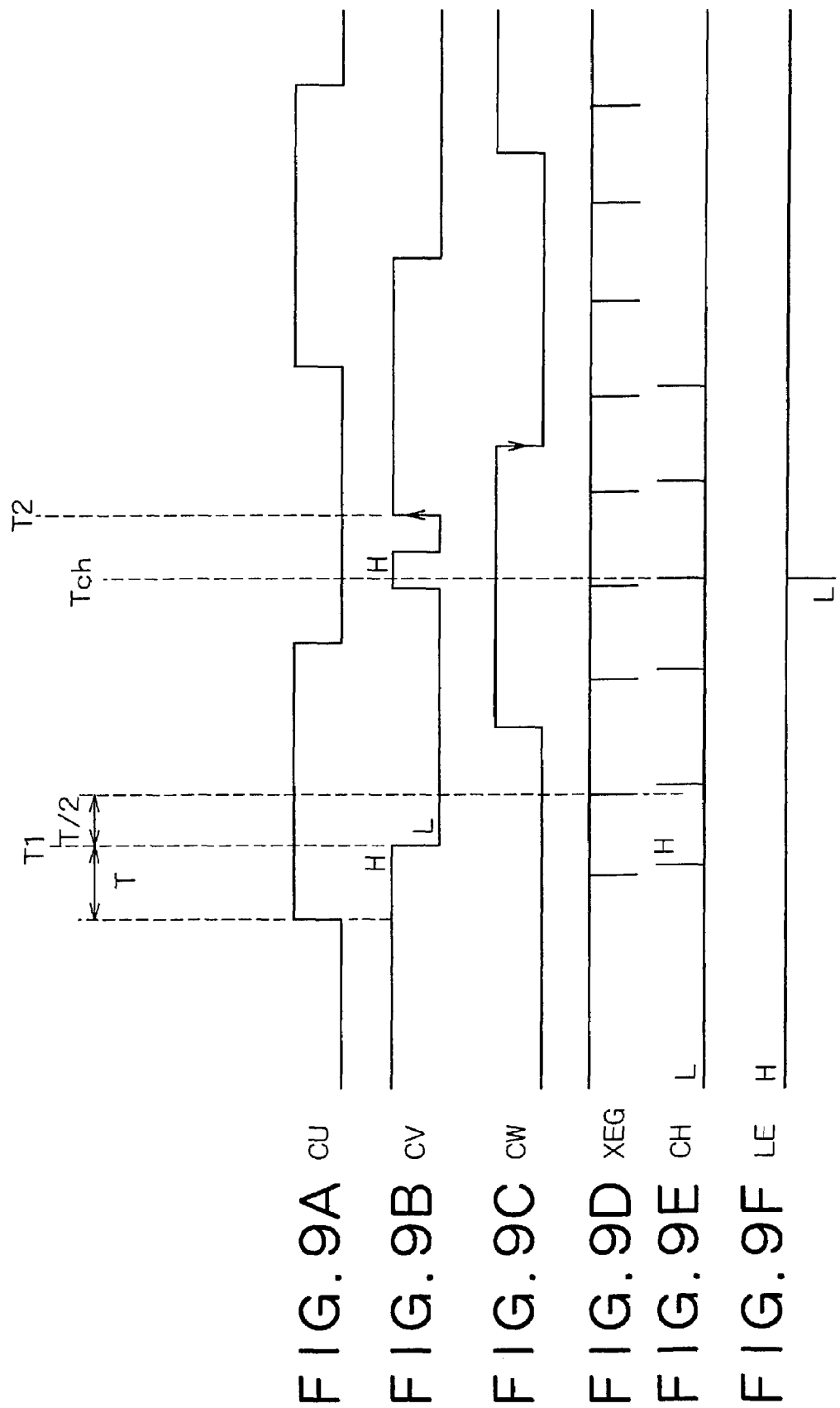
FIGS. 9A, 9B, 9C, 9D, 9E, and 9F are a fifth timing chart illustrating the operation of the interpolating edge circuit shown in FIG. 4.

Specifically, as shown in FIGS. 9A to 9F, when the signal CV makes a transition from a high level to a low level at a time T1, the level check unit 140 monitors the signal CV to determine whether the signal CV is at the low level for a period to a time T2. In this case, as shown in FIGS. 9A to 9F, when the level check unit 140 detects that the signal CV is at a high level at a time Tch, for example, the level check unit 140 determines that an abnormal operating state is present and outputs an interpolating edge signal LE, as shown in FIG. 9F, to the AND circuit 134. Incidentally, while the window unit 43 activates the check signal CH to a high level for example, in timing of transition from a high level to a low level (falling edge) of the mask signal MSK supplied thereto, the check signal CH may be activated in different timing.

The second method has been described above. With the second method, the level check unit 140 checks the level of the signals CU, CV, and CW to interpolate a signal determining phase switching timing according to an operating state.

The ON/OFF switching unit 139 included in the interpolating edge circuit 37 switches on or off the interpolating function, as described above. Specifically, when a switching signal SOF supplied to the ON/OFF switching unit 139 from the MCU 17 via the command decoding clock generating unit 40 specifies switch-on, the ON/OFF switching unit 139 supplies the lock signal LK from the edge determining unit 138 to the phase switching unit 33. When the switching signal SOF specifies switch-off, the ON/OFF switching unit 139 stops supplying the lock signal LK to the phase switching unit 33. The AND circuit 142 is supplied with the lock signal LK and the switching signal SOF, carries out an AND operation between the signals, and thereby generates a selection signal SS. Incidentally, the thus generated selection signal SS is supplied to the phase switching unit 33 and is used as a signal for controlling the phase switching operation, as described later.

Figure 10:
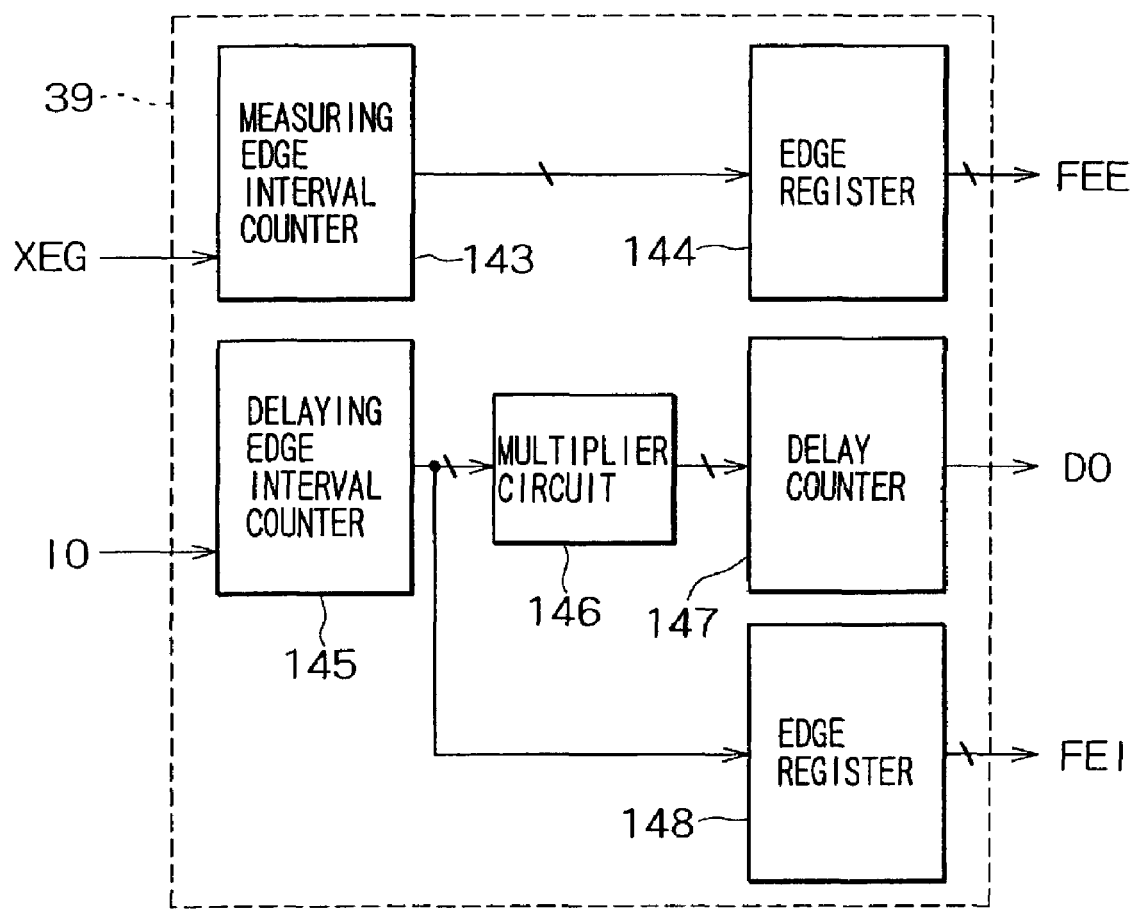
FIG. 10 is a block diagram showing a configuration of a delay circuit shown in FIG. 3.

The delay unit 39 supplied with the phase switching signal 10 generated as described above will be described next. FIG. 10 is a block diagram showing a configuration of the delay unit 39 shown in FIG. 3. As shown in FIG. 10, the delay unit 39 includes a measuring edge interval counter 143, an edge register 144, a delaying edge interval counter 145, a multiplier circuit 146, a delay counter 147, and an edge register 148.

The measuring edge interval counter 143 is connected to the edge detecting unit 31. The edge register 144 is connected to the measuring edge interval counter 143. The delaying edge interval counter 145 is connected to the interpolating edge circuit 37. The multiplier circuit 146 is connected to the delaying edge interval counter 145. The delay counter 147 is connected to the multiplier circuit 146. The edge register 148 is connected to the delaying edge interval counter 145.

An output terminal of the edge register 144 is connected to the command decoding clock generating unit 40. An output terminal of the delay counter 147 is connected to the phase switching unit 33. An output terminal of the edge register 148 is connected to the command decoding clock generating unit 40, the mask and limiter circuit 41, and the VS control unit 49.

The measuring edge interval counter 143 measures time intervals of edges according to the edge detection signal XEG. The edge register 144 stores a result of the measurement and also supplies the result of the measurement to the MCU 17 via the command decoding clock generating unit 40. Thus, the MCU 17 monitors a rotational state of the spindle motor 3 according to the result of the measurement supplied thereto. The monitoring is realized by execution of a predetermined program by the MCU 17, for example.

On the other hand, the delaying edge interval counter 145 measures the time intervals of edges according to the phase switching signal 10 supplied from the interpolating edge circuit 37. The multiplier circuit 146 multiplies a measured value by a predetermined constant. Data outputted from the multiplier circuit 146 are stored in the delay counter 147. The delay counter 147 generates a phase switching signal DO according to the data stored therein and then supplies the phase switching signal DO to the phase switching unit 33.

The value measured by the delaying edge interval counter 145 is also supplied to the edge register 148. The edge register 148 generates an edge interval signal FEI according to the value and then outputs the edge interval signal FEI.

Figure 11:
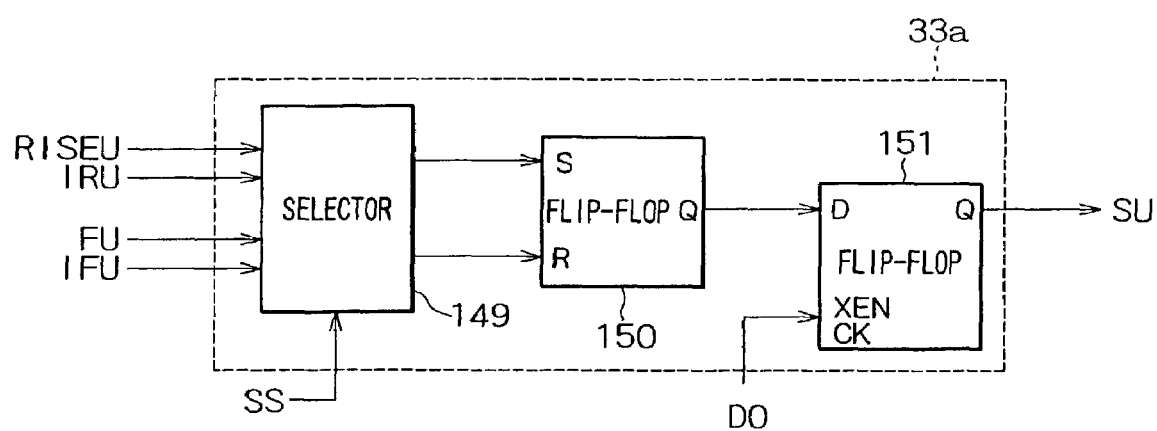
FIG. 11 is a block diagram showing a configuration of a phase switching circuit included in a phase switching unit shown in FIG. 3.

The phase switching operation of the phase switching unit 33 shown in FIG. 3 will be described next. FIG. 11 is a block diagram showing a configuration of a phase switching circuit 33a included in the phase switching unit 33. In this case, the phase switching circuit 33a shown in FIG. 11 corresponds to the U phase. The phase switching unit 33 further includes two phase switching circuits having the same configuration as the phase switching circuit 33a shown in FIG. 11 and corresponding to the V phase and the W phase.

As shown in FIG. 11, the phase switching circuit 33a includes a selector 149 and flip-flops 150 and 151. The flip-flop 150 performs a set-reset operation.

In this case, the selector 149 is connected to the edge detecting unit 31 and the interpolating edge circuit 37. The flip-flop 150 is connected to the selector 149. The flip-flop 151 has a D terminal connected to a Q terminal of the flip-flop 150 and a XEN terminal connected to the delay unit 39. A Q terminal of the flip-flop 151 outputs a signal su.

The operation of the phase switching circuit 33a will be described in the following. The selector 149 is supplied with a signal RISEU determining the rise timing of the signal CU and a signal FU determining the fall timing of the signal CU from the edge detecting unit 31, and it is supplied with an interpolating signal IRU corresponding to the rise and an interpolating signal IFU corresponding to the fall from the interpolating edge circuit 37. The selector 149 selectively supplies the flip-flop 150 with either the pair of signals RISEU and FU or the pair of interpolating signals IRU and IFU according to the selection signal SS supplied from the interpolating edge circuit 37.

When a switching signal SOF for switching on the interpolating function is supplied from the command decoding clock generating unit 40 to the interpolating edge circuit 37 and when a lock signal LK at a high level is outputted from the edge determining unit 138 included in the interpolating edge circuit 37, the selection signal SS is activated to a high level. The selector 149 selectively supplies the flip-flop 150 with the interpolating signals IRU and IFU when the activated selection signal SS is supplied thereto and selectively supplies the flip-flop 150 with the signals RISEU and FU when a selection signal SS at a low level is supplied thereto.

Though not shown in the figure, a signal for switching on the function of checking the level of the signals CU, CV, and CW simultaneously may be supplied from the command decoding clock generating unit 40 to the selector 149 so that the selector 149 selects output signals according to the signal. Specifically, in this case, the selector 149 selectively outputs the interpolating signals IRU and IFU in response to the signal for switching on the level checking function and selectively outputs the signals RISEU and FU in response to a signal for switching off the level checking function.

Next, the flip-flop 150 is set in response to the signal RISEU or the interpolating signal IRU supplied thereto, and it is reset in response to the signal FU or the interpolating signal IFU supplied thereto. The flip-flop 151 outputs a signal su based on a signal supplied from the flip-flop 150 according to the phase switching signal DO supplied from the delay unit 39. As described above, the drive logic and brake logic circuit 35 generates logical drive signals DU, DV, and DW according to the thus generated signals su, sv, and sw.

Thus, the phase switching circuit 33a is characterized in that the phase switching circuit 33a performs phase switching according to not only the signals RISEU and FU but also the interpolating signals IRU and IFU.

The phase relation between the signals CU, CV, and CW supplied to the edge detecting unit 31, the logical drive signals DU, DV, and DW, and the phase switching signal DO supplied from the delay unit 39 to the phase switching unit 33 is shown by a timing chart of FIGS. 12A, 12B, 12C, 12D, 12E, 12F, and 12G. As shown in FIGS. 12A to 12G, in timings T1 to T6 in which the phase switching signal DO is activated to a low level, the logical levels of the logical drive signals DU, DV, and DW are changed.

Specifically, for example, at the time T1 when the phase switching signal DO is activated, the logical drive signal DU is changed from a low level (L) to a high level (H); at the time T2, the logical drive signal DV is changed from a high level to a low level; and, at the time T3, the logical drive signal DW is changed from a low level to a high level. At the time T4 when the phase switching signal DO is activated, the logical drive signal DU is changed from the high level to the low level; at the time T5, the logical drive signal DV is changed from the low level to the high level; and, at the time T6, the logical drive signal DW is changed from the high level to the low level.

Thus, with the disk driving apparatus according to the embodiment of the present invention, the control of the rotation of the motor not highly subject to a disturbance to the rotation of the motor or a sudden change in the rotational speed of the motor can be realized by a digital signal processing system.

That is, the disk driving apparatus described above is formed by digital circuits, and, therefore, the disk driving apparatus eliminates the need for a so-called external component, such as a loop filter of a PLL circuit, a voltage-controlled oscillator and the like, in contrast to a driving apparatus using an analog control system.

In addition, since the conditions for bringing the control of the rotation of the motor into a locked state can be set arbitrarily by the commands issued from the MCU 17, various rotational controls can be readily realized by software executed by the MCU 17.

Furthermore, with the disk driving apparatus according to the embodiment of the present invention, the system LSI 20 controls the rotation of the spindle motor 3 in a manner as described above. It is therefore possible to reduce a load on a microcomputer (not shown) that controls the disk driving apparatus externally, or, more specifically, a load on a CPU incorporated in the microcomputer, and to reduce the scale of software executed in the CPU. In turn, it is possible to reduce the circuit scale of a RAM and a ROM for storing the software in a coded state and thus to reduce cost.

Furthermore, since the disk driving apparatus according to the embodiment of the present invention is formed by digital circuits, as described above, the disk driving apparatus can be highly integrated readily, and the cost can be reduced.

It is to be noted that while the above description has been made by taking as an example a case where the present invention is applied to the control of the spindle motor 3, the present invention is of course applicable to control of a sled-motor (not shown) included in the reading unit 5.

The disk driving apparatus according to the present invention can readily maintain a state of the motor being driven for rotation while using an interpolating signal when a timing signal has been generated normally for a predetermined period. Therefore, it is possible to enhance stability and reliability in the control of the rotation of the motor.

In addition, with the disk driving apparatus according to the present invention, a signal level determining means can monitor a timing signal to readily determine whether the timing signal is generated normally, thus making it possible to readily realize control of the motor by an interpolating signal as required. It is therefore possible to enhance reliability in the control of the rotation of the motor.

While preferred embodiments of the present invention have been described using specific terms, such description is for illustrative purposes only, and it is to be understood that changes and variations may be made without departing from the spirit or scope of the following claims.

What is claimed is:

1. A disk driving apparatus for driving a disk mounted therein by a motor controlled by a timing signal determining timing of phase switching, said disk driving apparatus comprising:
    interpolating signal generating means for generating an interpolating signal in accordance with a cycle of said timing signal;
    period measuring means for measuring a period for which said timing signal is generated normally; and
    motor control means for controlling said motor by both said timing signal and said interpolating signal when said period measured by said period measuring means reaches a predetermined value.

2. A disk driving apparatus as claimed in claim 1, further comprising operation switching means for switching an operation by selectively supplying said motor control means with one of said timing signal and said interpolating signal according to a switching signal supplied thereto.

3. A disk driving apparatus as claimed in claim 1, further comprising:
    window signal generating means for generating a window signal that is periodically activated for a predetermined period in accordance with the cycle of said timing signal; and
    interpolating signal masking means for supplying said motor control means with only said interpolating signal generated within the period for which said window signal is activated.

4. A disk driving apparatus for driving a disk mounted therein by a motor controlled by a timing signal determining timing of phase switching, said disk driving apparatus comprising:
    interpolating signal generating means for generating an interpolating signal in accordance with a cycle of said timing signal;
    signal level determining means for determining in predetermined timing whether a logical level of said timing signal is an expected logical level; and
    motor control means for controlling said motor according to said timing signal and controlling said motor according to said interpolating signal when said signal level determining means determines that the logical level of said timing signal is not said expected logical level.

5. A disk driving apparatus as claimed in claim 4, further comprising:
    window signal generating means for generating a window signal that is periodically activated for a predetermined period in accordance with the cycle of said timing signal; and
    interpolating signal masking means for supplying said motor control means with only said interpolating signal generated within the period for which said window signal is activated.

* * * * *